(12) United States Patent
Bulekbay et al.

(10) Patent No.: US 11,242,738 B2
(45) Date of Patent: Feb. 8, 2022

(54) REMOVING DEBRIS FROM A HYDROCARBON FLUID

(71) Applicant: Saudi Arabian Oil Company, Dhahran (SA)

(72) Inventors: Aslan Bulekbay, Udhailiyah (SA); Mustafa Al-Zaid, Mubarraz (SA); Manaf Al-Aithan, Hasa (SA); Khalid I. Alhamed, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 121 days.

(21) Appl. No.: 16/842,405

(22) Filed: Apr. 7, 2020

(65) Prior Publication Data

US 2020/0230524 A1 Jul. 23, 2020

Related U.S. Application Data

(62) Division of application No. 15/688,328, filed on Aug. 28, 2017, now Pat. No. 10,625,181.

(51) Int. Cl.
| | |
|---|---|
| *E21B 43/34* | (2006.01) |
| *C10G 31/00* | (2006.01) |
| *B01D 21/00* | (2006.01) |
| *B01D 45/08* | (2006.01) |

(52) U.S. Cl.
CPC .......... *E21B 43/34* (2013.01); *B01D 21/0042* (2013.01); *B01D 21/0045* (2013.01); *B01D 21/0048* (2013.01); *C10G 31/00* (2013.01); *B01D 45/08* (2013.01)

(58) Field of Classification Search
CPC .... B01D 21/0042; B01D 45/08; C10G 31/00; E21B 43/34
See application file for complete search history.

(56) References Cited

U.S. PATENT DOCUMENTS

| | | |
|---|---|---|
| 381,374 A | 4/1888 | Hine |
| 774,519 A | 11/1904 | Greenaway |
| 4,106,562 A | 8/1978 | Barnes et al. |
| 5,394,339 A | 2/1995 | Jones |
| 6,032,539 A | 3/2000 | Liu |
| 6,263,970 B1 | 7/2001 | Blanchet |

(Continued)

OTHER PUBLICATIONS

International Search Report and Written Opinion issued in International Application No. PCT/US2018/048054 dated Nov. 12, 2018, 14 pages.

(Continued)

*Primary Examiner* — John Kim
(74) *Attorney, Agent, or Firm* — Fish & Richardson P.C.

(57) ABSTRACT

A hydrocarbon production apparatus that removes debris from a hydrocarbon fluid is described. The apparatus includes a first conduit, a second conduit, a valve, and at least one baffle. The first conduit includes an inlet, an outlet, and a flow path that extends between the inlet and the outlet. The flow path can receive a flow of a hydrocarbon fluid, which includes debris, from the inlet and direct the hydrocarbon fluid from the inlet to the outlet. The second conduit includes a debris receptacle. The valve is fluidly coupled to the second conduit and can isolate the debris receptacle from the flow path of the first conduit and at least a portion of the second conduit. The at least one baffle is oriented to direct at least a portion of the debris from the flow path of the first conduit to the second conduit.

13 Claims, 5 Drawing Sheets

(56) References Cited

U.S. PATENT DOCUMENTS

| | | |
|---|---|---|
| 6,419,730 B1 | 7/2002 | Chavez |
| 6,766,856 B1 | 7/2004 | McGee |
| 7,735,548 B2 | 6/2010 | Cherewyk |
| 9,095,799 B1 | 8/2015 | Packard |
| 9,114,332 B1 | 8/2015 | Liu |
| 2002/0043507 A1 | 4/2002 | McCulloch |
| 2013/0032549 A1 | 2/2013 | Brown et al. |

OTHER PUBLICATIONS

Gulf Cooperation Council Examination Report issued in GCC Application No. 2018-35922 dated Jan. 10, 2020, 4 pages.
GCC Examination Report in GCC Appln. No. 2018-35922, dated Apr. 18, 2020, 4 pages.

REMOVING DEBRIS FROM A HYDROCARBON FLUID

CLAIM OF PRIORITY

This application claims priority to and is a divisional of U.S. patent application Ser. No. 15/688,328, filed on Aug. 28, 2017, issued as U.S. Pat. No. 10,625,181, the entire contents of which are hereby incorporated by reference.

TECHNICAL FIELD

This specification relates to handling well debris flowing with well fluids.

BACKGROUND

During hydrocarbon production, well fluid flowing from a hydrocarbon reservoir to the surface can include debris such as sand, foreign materials from previous well operations, small piece of metallic or plastic material, or coating materials from sections of a well completion. If left unhandled, debris—especially large, hard, or sharp-edged debris—carried by the well fluid can cause erosion wear as the debris travels through or past equipment or process instruments. The debris can also plug or damage well equipment, which can potentially cause a catastrophic failure of a piece of equipment. Equipment failure can negatively impact production and can increase field asset operating costs. Taking measures to preserve and extend the life of well equipment and instruments is favorable to keep production economical.

SUMMARY

The present disclosure describes technologies relating to handling well debris without interrupting hydrocarbon production from a well. In a general implementation, a hydrocarbon production apparatus includes a first conduit including an inlet and an outlet and a flow path that extends between the inlet and the outlet, the flow path configured to receive a flow of a hydrocarbon fluid from the inlet and direct the hydrocarbon fluid from the inlet to the outlet, the hydrocarbon fluid including debris; a second conduit angularly connected to the first conduit between the inlet and the outlet, the second conduit including a debris receptacle; a valve fluidly coupled to the second conduit and configured to isolate the debris receptacle from the flow path of the first conduit and at least a portion of the second conduit; and at least one baffle coupled to a portion of an inner surface of the first conduit between the inlet and the outlet, the at least one baffle oriented to direct at least a portion of the debris from the flow path of the first conduit to the second conduit.

In an aspect combinable with the general implementation, the second conduit is connected to the first conduit such that a longitudinal axis of the first conduit and a longitudinal axis of the second conduit intersect at an angle of 90 degrees or less.

In another aspect combinable with any one of the previous aspects, the valve includes an isolation valve, an inlet, and an outlet, and the receptacle is connected to the outlet of the valve.

In another aspect combinable with any one of the previous aspects, the at least one baffle is coupled to the inner surface of the first conduit at an angle of 90 degrees or less.

In another aspect combinable with any one of the previous aspects, a perpendicular distance between a tip of the at least one baffle and the inner surface of the first conduit is approximately half of a diameter of the first conduit or longer.

In another aspect combinable with any one of the previous aspects, the at least one baffle is a first baffle and the apparatus further includes a second baffle coupled to a second portion of the inner surface of the first conduit between the inlet and the outlet.

In another aspect combinable with any one of the previous aspects, the second baffle is oriented to direct a portion of the debris from the flow path of the first conduit to the second conduit.

In another aspect combinable with any one of the previous aspects, a perpendicular distance between a tip of the second baffle and the inner surface of the first conduit is approximately half of a diameter of the first conduit or longer.

In another aspect combinable with any one of the previous aspects, an axial distance between the tip of the first baffle and a tip of the second baffle is approximately half of a diameter of the first conduit or longer.

In another aspect combinable with any one of the previous aspects, the second baffle is coupled to the inner surface of the first conduit at an angle of 90 degrees or less.

In another aspect combinable with any one of the previous aspects, the receptacle includes a pressure instrument and a bleed valve configured to relieve fluid from the receptacle.

In another general implementation, a hydrocarbon production system includes a hydrocarbon production piping configured to connect to a wellhead; and an apparatus positioned in the hydrocarbon production piping downstream of the wellhead. The apparatus includes a first conduit configured to receive a flow of a hydrocarbon fluid from the hydrocarbon production piping, the hydrocarbon fluid including debris; a second conduit angularly connected to the first conduit, the second conduit including a valve and a debris receptacle, the valve configured to isolate the debris receptacle from the first conduit and a portion of the second conduit; and at least one baffle coupled to the first conduit, the at least one baffle oriented to direct at least a portion of the debris from the flow of the hydrocarbon fluid from the first conduit to the second conduit.

An aspect combinable with the general implementation further includes a pressure instrument, a temperature instrument, a flow instrument, and a control valve, all positioned in the hydrocarbon production piping downstream of the apparatus.

In another aspect combinable with any one of the previous aspects, the second conduit is connected to the first conduit at an angle of 90 degrees or less.

In another aspect combinable with any one of the previous aspects, the valve includes an isolation valve, an inlet, and an outlet, and the receptacle is connected to the outlet of the valve.

In another aspect combinable with any one of the previous aspects, the at least one baffle is coupled to a portion of an inner surface of the first conduit at an angle of 90 degrees or less.

In another aspect combinable with any one of the previous aspects, a perpendicular distance between a tip of the at least one baffle and an inner surface of the first conduit is approximately a diameter of a flow area of the control valve fully open or longer.

In another aspect combinable with any one of the previous aspects, the at least one baffle is a first baffle and the system further includes a second baffle coupled to a second portion of the inner surface of the first conduit.

In another aspect combinable with any one of the previous aspects, the second baffle oriented to direct a portion of the debris from the first conduit to the second conduit.

In another aspect combinable with any one of the previous aspects, a perpendicular distance between a tip of the second baffle and the inner surface of the first conduit is approximately the diameter of the flow area of the control valve fully open or longer.

In another aspect combinable with any one of the previous aspects, the second baffle is coupled to the inner surface of the first conduit at an angle of 90 degrees or less.

In another aspect combinable with any one of the previous aspects, an axial distance between the tip of the first baffle and the tip of the second baffle is approximately the diameter of the flow area of the control valve fully open or longer.

In another aspect combinable with any one of the previous aspects, the receptacle includes a pressure instrument and a bleed valve configured to relieve fluid from the receptacle.

In another general implementation, a method for removing debris from a hydrocarbon fluid flow stream includes receiving a flow of a hydrocarbon fluid that includes debris into an inlet of a first conduit that includes a flow path that extends between the inlet and an outlet of the first conduit; separating at least a portion of the debris from the hydrocarbon fluid with at least one baffle that is coupled to a portion of an inner surface of the first conduit between the inlet and the outlet; directing the portion of separated debris into a debris receptacle of a second conduit that is angularly connected to the first conduit between the inlet and the outlet; fluidly isolating the debris receptacle from the flow path of the first conduit and at least a portion of the second conduit; and subsequent to fluidly isolating the debris receptacle, removing the portion of separated debris from the debris receptacle.

In an aspect combinable with the general implementation, isolating the debris receptacle includes closing a valve fluidly coupled to the second conduit.

In another aspect combinable with any one of the previous aspects, removing the separated debris includes bleeding a portion of a fluid from the receptacle to reduce pressure within the receptacle; verifying the pressure within the receptacle; disconnecting the receptacle; and removing the separated debris and a remaining portion of the fluid from the receptacle.

In another aspect combinable with any one of the previous aspects, bleeding the portion of the fluid from the receptacle includes opening a bleed valve.

In another general implementation, a method for servicing a hydrocarbon production apparatus for removing debris from a fluid flow stream includes closing a valve to isolate a receptacle of the apparatus from the fluid flow stream, the receptacle including fluid and debris from the fluid flow stream; bleeding a portion of a fluid from the receptacle to reduce pressure within the receptacle; verifying the pressure within the receptacle; disconnecting the receptacle from the apparatus; removing the debris and a remaining portion of the fluid from the receptacle; reconnecting the receptacle to the apparatus; and opening the valve.

The subject matter described in this specification can be implemented in particular implementations, so as to realize one or more of the following advantages. Debris flowing with well fluid can be diverted to a receptacle, which can be disconnected from the production piping, emptied, and reconnected to the production piping while production continues.

The details of one or more implementations of the subject matter of this specification are set forth in the accompanying drawings and the description. Other features, aspects, and advantages of the subject matter will become apparent from the description, the drawings, and the claims.

DETAILED DESCRIPTION

This disclosure describes an apparatus that can be installed on a hydrocarbon production piping near a wellhead and can direct debris flowing with a well fluid to a receptacle. The well fluid exiting the apparatus can include less debris, which can reduce the likelihood of damaging or plugging downstream instruments or equipment. The apparatus can include a valve that can be used to isolate the receptacle from a portion of the apparatus. Because the receptacle can be isolated from a portion of the apparatus, the receptacle can be emptied while well fluid continues to flow. In other words, production can continue while the receptacle is being emptied. This disclosure also describes a method for removing debris from a hydrocarbon stream and a method for servicing an apparatus that can remove debris from a stream.

The following detailed description describes technologies relating to handling well debris flowing with well fluids, and is presented to enable any person skilled in the art to make and use the disclosed subject matter in the context of one or more particular implementations. Various modifications, alterations, and permutations of the disclosed implementations can be made and will be readily apparent to those or ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features. Although this disclosure describes technologies in context with well fluids and hydrocarbon production wells, the technologies can optionally be applied to any fluid that carries debris. For example, the technologies can be applied to handling debris flowing with fluids from water production wells. As another example, the technologies can be applied to a surface facility that may be located away from a wellhead, where debris handling and control is desirable.

Figure 1:
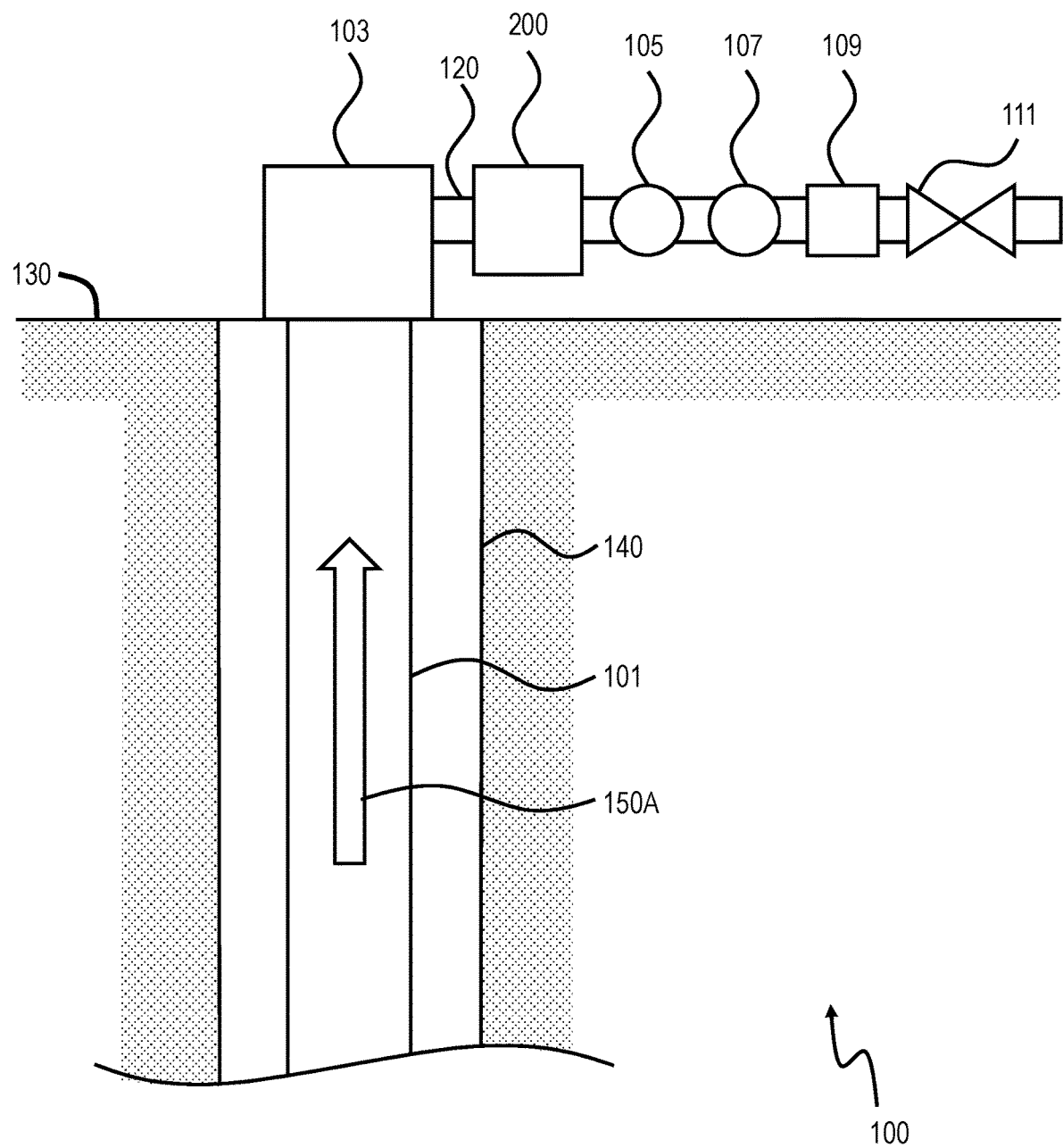
FIG. 1 is a diagram of an example of a hydrocarbon production system.

FIG. 1 illustrates an example of a hydrocarbon production system 100. The production system 100 can include a hydrocarbon production piping 120 connected to a wellhead 103 above the surface 130. The wellhead 103 can be connected to a production casing 101 that extends down a wellbore 140. The production casing 101 can isolate a hydrocarbon producing zone of a rock formation from other formations along the wellbore. The production system 100 can optionally include additional casings, such as a conductor casing or surface casing. The wellhead 103 can serve as a pressure-containing interface between the casing 101 and the production piping 120. Well fluid 150A can flow uphole through the casing 101 to the surface 130 and flow through the piping 120 to an end user. The well fluid 150A can also carry debris as it flows through the casing 101 and piping 120.

The production system 100 can include various components along the production piping 120 downstream of the wellhead 103, such as a hydrocarbon production apparatus 200 for removing debris and a control valve 111 for controlling the flow of well fluid 150A. The production system 100 can optionally include various process instruments for monitoring and process controlling purposes, such as a pressure instrument 105, a temperature instrument 107, and a flow instrument 109. The apparatus 200 (also referred to as a debris removing apparatus and described in more detail later), in operation, reduces the amount of debris flowing with the well fluid 150A by diverting a portion of the debris away from the main flow of well fluid 150A. Since debris can damage and clog instruments and equipment, the apparatus 200 can be positioned along the production piping 120 directly downstream of the wellhead 103 and upstream of any instruments or equipment, such as the control valve 111 and its associated instruments (105, 107, 109), so that debris can be removed from the well fluid 150A before reaching the downstream instrument and equipment.

Figure 2:
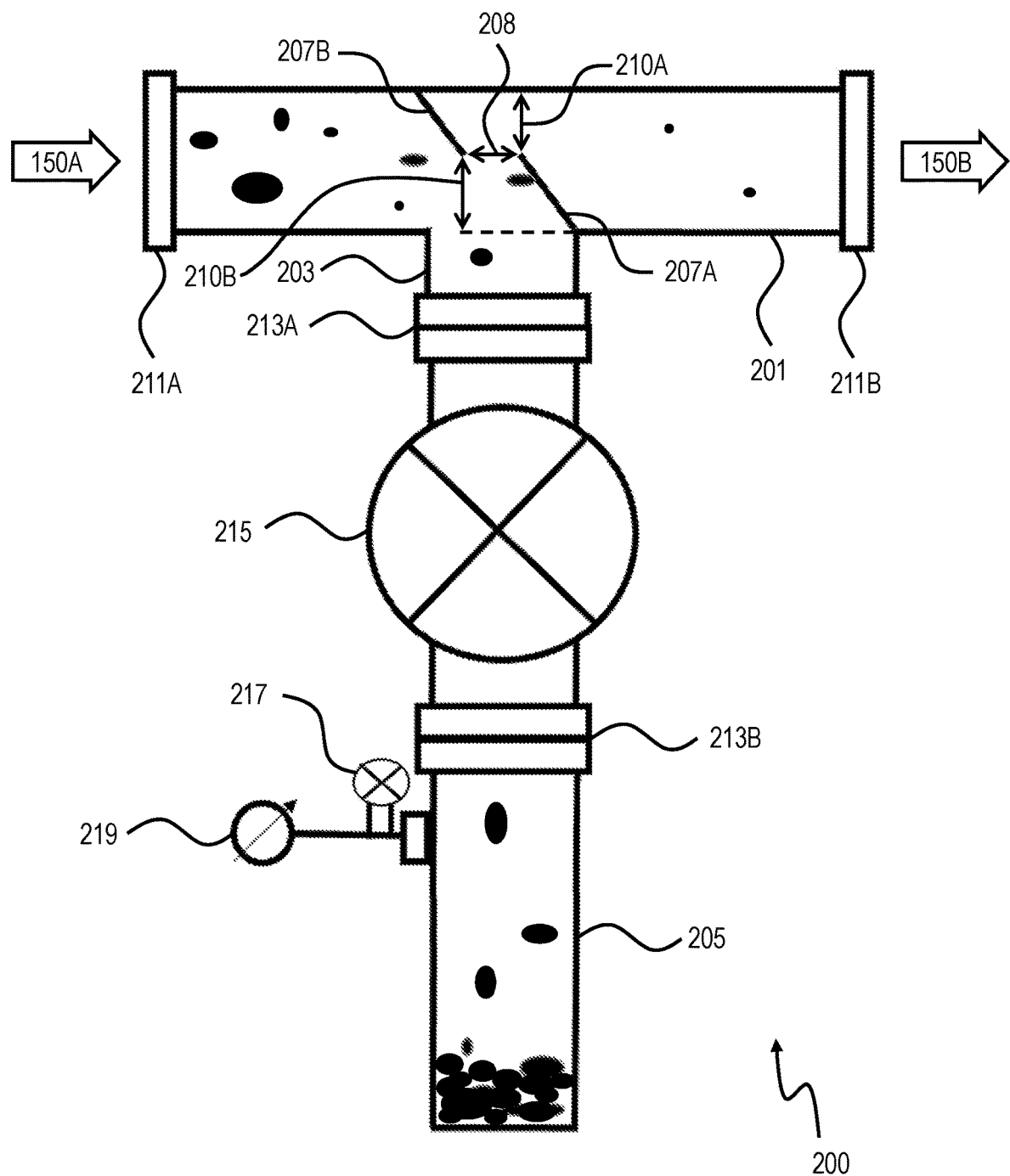
FIG. 2 is a diagram of an example of a debris catching device.

Referring to FIG. 2, the debris removing apparatus 200 can include a first conduit 201, a second conduit 203, a valve 215, and a baffle 207A. With respect to the hydrocarbon production system 100 (referring back to FIG. 1), the first conduit 201 and the second conduit 203 can be made of the same material as the production piping 120 or another material, such as stainless steel suitable for sour service (that is, hydrogen sulfide service). The first conduit 201 has an inlet 211A and an outlet 211B, with a flow path that extends between the inlet 211A and the outlet 211B to receive a flow of a hydrocarbon fluid from the inlet 211A and direct the hydrocarbon fluid from the inlet 211A to the outlet 211B. The hydrocarbon fluid can include debris and can be, for example, the debris-carrying well fluid 150A. The inlet 211A and outlet 211B are connected to the production piping 120. The second conduit 203 can be angularly connected to the first conduit 201 between the inlet 211A and the outlet 211B.

With respect to the hydrocarbon production system 100 (referring back to FIG. 1), the first conduit 201 can have a diameter that is approximately equal to the diameter of the production piping 120. In the case that the first conduit 201 and the piping 120 have approximately the same diameter, the first conduit 201 and the piping 120 would also have approximately the same cross-sectional area, resulting in the well fluid 150A flowing through the apparatus 200 at approximately the same velocity. In this specification, "approximately" means a deviation or allowance of up to 10 percent (%) and any variation from a mentioned value is within the tolerance limits of any machinery used to manufacture the part.

In certain implementations, in order to have a velocity of the debris-carrying well fluid 150A flowing through the apparatus 200 higher than the velocity through the piping 120, the diameter of the first conduit 201 is smaller than the diameter of the piping 120. In other implementations, in order to have a velocity of the debris-carrying well fluid 150A flowing through the apparatus 200 lower than the velocity through the piping 120, the diameter of the first conduit 201 is larger than the diameter of the piping 120.

The second conduit 203 includes a debris receptacle 205. The receptacle 205 can include a pressure instrument 219 and a bleed valve 217 that can open to relieve a fluid from the receptacle 205. The receptacle 205 can be made of the same material as the second conduit 203 or another material. The receptacle 205 can have any shape, such as cylindrical or cuboidal. The size of the receptacle 205 can be determined based on size constraints, for example, the available space at the site below the production piping 120. A larger receptacle 205 can potentially result in the need to service the apparatus 200 less often due to its capacity to hold a larger amount of debris before needing to be emptied.

The receptacle 205 can optionally include an optically transparent window (not shown) to allow observation of debris accumulation within the receptacle 205. In some implementations, the second conduit 203 is connected to the first conduit 201, such that a longitudinal axis of the first conduit 201 and a longitudinal axis of the second conduit 203 intersect perpendicularly (that is, at an angle of 90 degrees), as shown on FIG. 2.

In some implementations, the longitudinal axis of the first conduit 201 and the longitudinal axis of the second conduit 203 intersect at an angle less than 90 degrees. The valve 215 is fluidly coupled to the second conduit 203 and can isolate the debris receptacle 205 from the flow path of the first conduit 201 and at least a portion of the second conduit 203. In some implementations, the valve 215 is an isolation valve that has an inlet 213A and an outlet 213B, and the receptacle 205 is connected to the valve outlet 213B.

The baffle 207A (also referred to as the first baffle) is coupled to a portion of the inner surface of the first conduit 201 between the inlet 211A and the outlet 211B, for example, the bottom portion, and can be oriented to direct at least a portion of the debris from the flow path of the first conduit 201 to the second conduit 203. The baffle 207A can be coupled to the first conduit 201 at an angle of 90 degrees or less, such as 45 degrees. The perpendicular distance 210A between the tip of the baffle 207A and the inner surface of the first conduit 201 can be approximately equal to or longer than half of the diameter of the first conduit 201. With respect to the hydrocarbon production system 100 (referring back to FIG. 1), in certain implementations, the distance 210A can be approximately equal to or longer than the diameter of the flow area of the control valve 111 when the valve 111 is fully open (that is, at 100% travel).

The debris removing apparatus 200 can include an additional baffle, such as baffle 207B (also referred to as the second baffle), which can be coupled to another portion of the inner surface of the first conduit 201 between the inlet 211A and the outlet 211B, for example, the top portion. The second baffle 207B can have similar characteristics as the first baffle 207A. For example, the second baffle 207B can also be oriented to direct a portion of the debris from the flow path of the first conduit 201 to the second conduit 203. The second baffle 207B can also be coupled to the first conduit 201 at an angle of 90 degrees or less. The perpendicular distance 210B between the tip of the second baffle 207B and the inner surface of the first conduit 201 can also be approximately equal to or longer than half of the diameter of the first conduit 201. The axial distance 208 between the tip of the first baffle 207A and the tip of the second baffle 207B can be approximately equal to or longer than half of the diameter of the first conduit 201.

With respect to the hydrocarbon production system 100 (referring back to FIG. 1), in certain implementations, the distance 210B can be approximately equal to or longer than the diameter of the flow area of the control valve 111 when the valve 111 is fully open (that is, at 100% travel). In certain implementations, the axial distance 208 can be approximately equal to or longer than the diameter of the flow area of the control valve 111 when the valve 111 is fully open (that is, at 100% travel).

In other implementations, the distances 210A, 210B, and 208 are approximately equal to or longer than the diameter of the smallest flow area of any downstream instruments and pieces of equipment (not shown) along the production piping 120. The apparatus 200 can optionally include additional baffles. The baffles (such as 207A and 207B) can be made of the same material as the first conduit 201 or a higher strength material, such as polycrystalline diamond compact (PDC), which is abrasion-resistant and corrosion-resistant.

In operation, the apparatus 200 receives at its inlet 211A, debris-carrying well fluid 150A from the production piping 120. As the well fluid 150A flows through the first conduit 201, debris can come in contact with at least one baffle (such as baffles 207A and 207B) and be directed to the second conduit 203. The debris can flow through the second conduit 203 and can settle and accumulate within the receptacle 205, as well fluid continues to flow through the first conduit 201.

Some debris can travel past the baffles of the first conduit 201. In other words, a portion of the debris carried by well fluid 150A can flow through the first conduit 201 without coming in contact with the baffles. Downstream of the baffles (for example, 207A and 207B), the well fluid 150B can carry a smaller amount of debris. The well fluid 150B with less debris flows out of the apparatus 200 through its outlet 211B, and continues to flow through the production piping 120.

Figure 3:
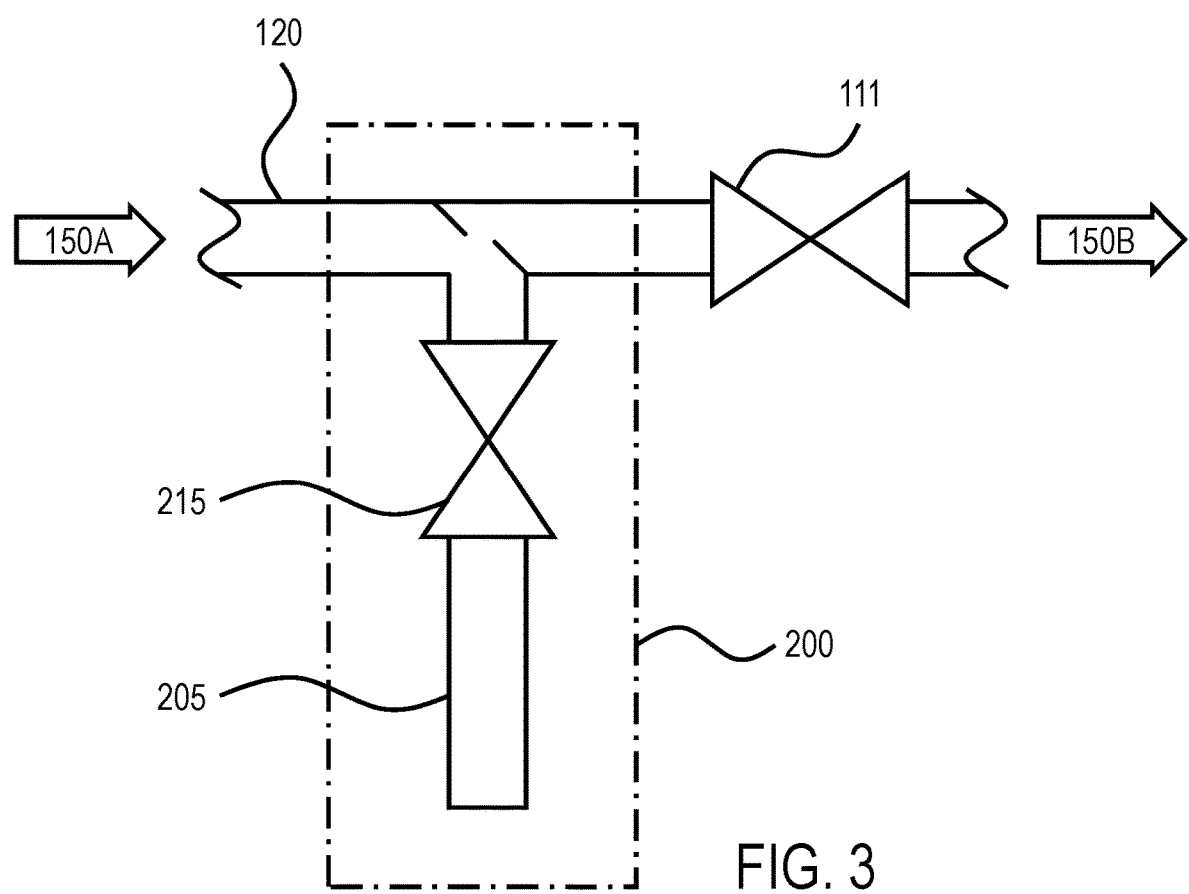
FIG. 3 is a diagram of an example of a wellhead system with a debris catching device.

FIG. 3 illustrates a simplified view of a section of a hydrocarbon production system, such as the system 100 shown in FIG. 1. Auxiliary components such as pressure or flow instruments can be included but are not shown in FIG. 3. Well fluid 150A can carry debris as it flows through the production piping 120. A debris removing apparatus, such as the apparatus 200 shown in FIG. 2, is positioned upstream of a valve, such as the control valve 111 shown in FIG. 1. The apparatus 200 can direct a portion of the debris carried by the well fluid 150A to the receptacle 205. The well fluid 150B exiting the apparatus 200 can carry less debris than the well fluid 150A entering the apparatus 200. Because the apparatus 200 is located upstream of the control valve 111 and can remove debris before the debris reaches the valve 111, the likelihood of debris plugging or damaging the valve 111 can be reduced.

In operation, debris can accumulate within the receptacle 205 of the debris removing apparatus 200. After some period of operation, the receptacle 205 may be emptied. The valve 215 can be closed to isolate the receptacle 205 from the rest of the apparatus 200 and main flow of well fluid 150A, so that the receptacle 205 can be emptied while production continues.

In certain implementations, the production system 100 can include additional debris removing apparatuses (such as the apparatus 200) in series. The multiple apparatuses can be the same, or each apparatus can have different dimensions and be designed to remove varying target sizes of debris from the well fluid 150A. In certain implementations, the production system 100 can include additional debris removing apparatuses (such as the apparatus 200) in parallel. In such implementations, the production piping 120 can be split into multiple, smaller pipes. The production system 100 can include multiple debris removing apparatuses in a combination of series and parallel configurations. The configuration can be chosen based on size constraints while also taking into consideration pressure drop of the well fluid as the well fluid flows through the apparatus.

Figure 4:
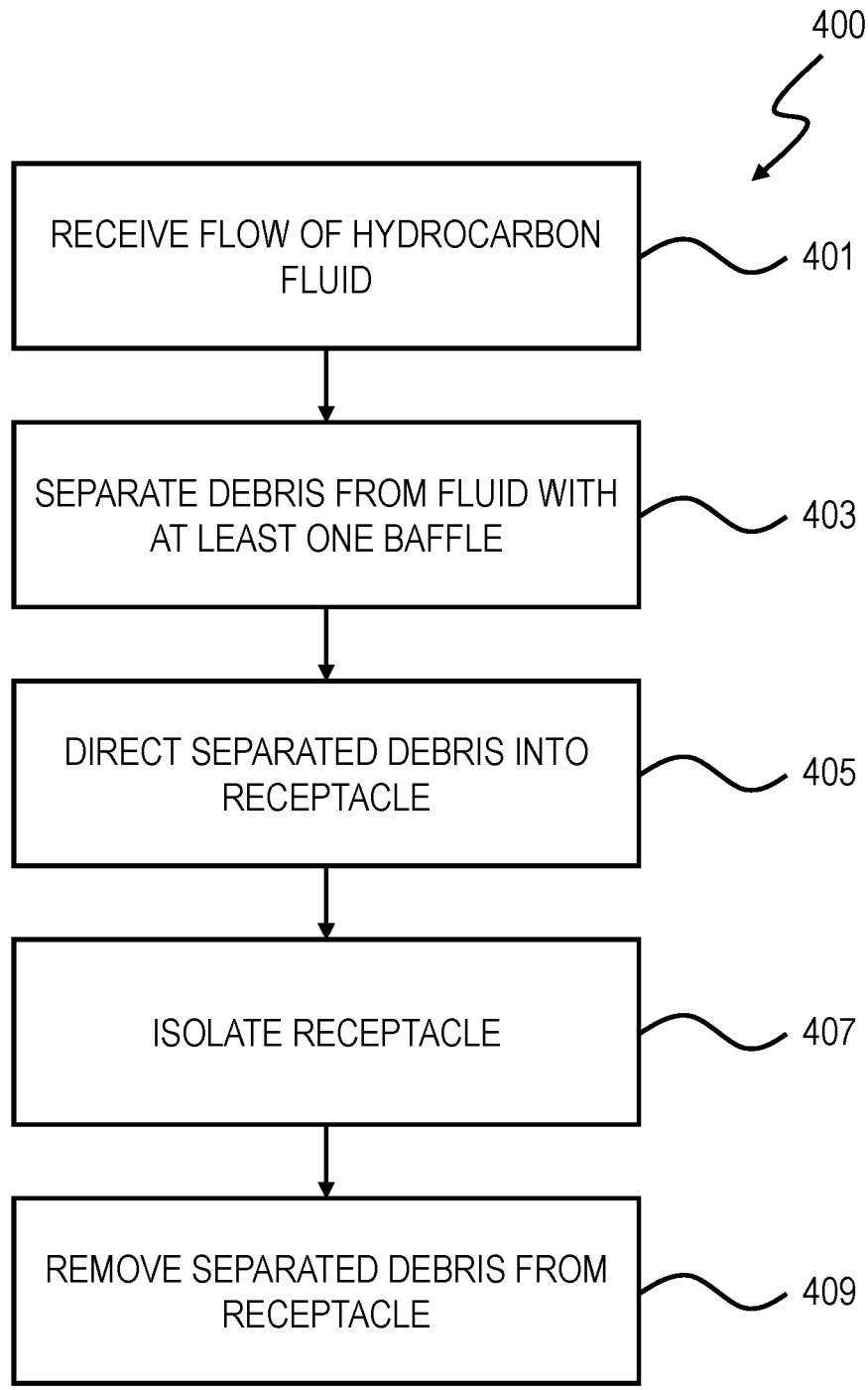
FIG. 4 is a flow chart of an example of a method for removing debris from a flow stream.

FIG. 4 is a flow chart of a method 400 for removing debris from a hydrocarbon fluid flow stream. The method 400 starts at 401 by receiving a flow of a hydrocarbon fluid including debris, such as well fluid 150A, into an inlet of a first conduit, such as the conduit 201 of apparatus 200 shown in FIG. 2. The fluid can come from a production piping, such as piping 120, and the first conduit can be connected to the piping. The first conduit includes a flow path that extends between the inlet (for example, inlet 211A) and an outlet (for example, outlet 211B) of the first conduit.

From 401, method 400 proceeds to 403, where at least a portion of the debris from the hydrocarbon fluid is separated with at least one baffle (such as baffle 207A) that is coupled to a portion of an inner surface of the first conduit between the inlet and the outlet. The debris can be separated with additional baffles (such as baffle 207B).

At 405, the portion of separated debris is directed into a debris receptacle (such as receptacle 205) of a second conduit (such as conduit 203) that is angularly connected to the first conduit between the inlet and the outlet. Each baffle can be oriented to direct a portion of the debris from the flow path of the first conduit to the second conduit, which includes the receptacle. The second conduit is connected to the first conduit such that a longitudinal axis of the first conduit and a longitudinal axis of the second conduit intersect at an angle of 90 degrees (that is, perpendicularly) or less.

From 405, method 400 proceeds to 407, where the debris receptacle is fluidly isolated from the flow path of the first conduit and at least a portion of the second conduit. The receptacle can be isolated by closing a valve that is fluidly coupled to the second conduit, such as the valve 215.

Subsequent to fluidly isolating the debris receptacle at 407, method 400 proceeds to 409, where the portion of separated debris is removed from the debris receptacle. Removing the debris from the receptacle can involve bleeding a portion of a fluid from the receptacle (for example, by opening a bleed valve) to reduce pressure within the receptacle and verifying that the pressure within the receptacle is at an acceptable level before disconnecting the receptacle. The debris and remaining portion of fluid within the receptacle can be removed.

Figure 5:
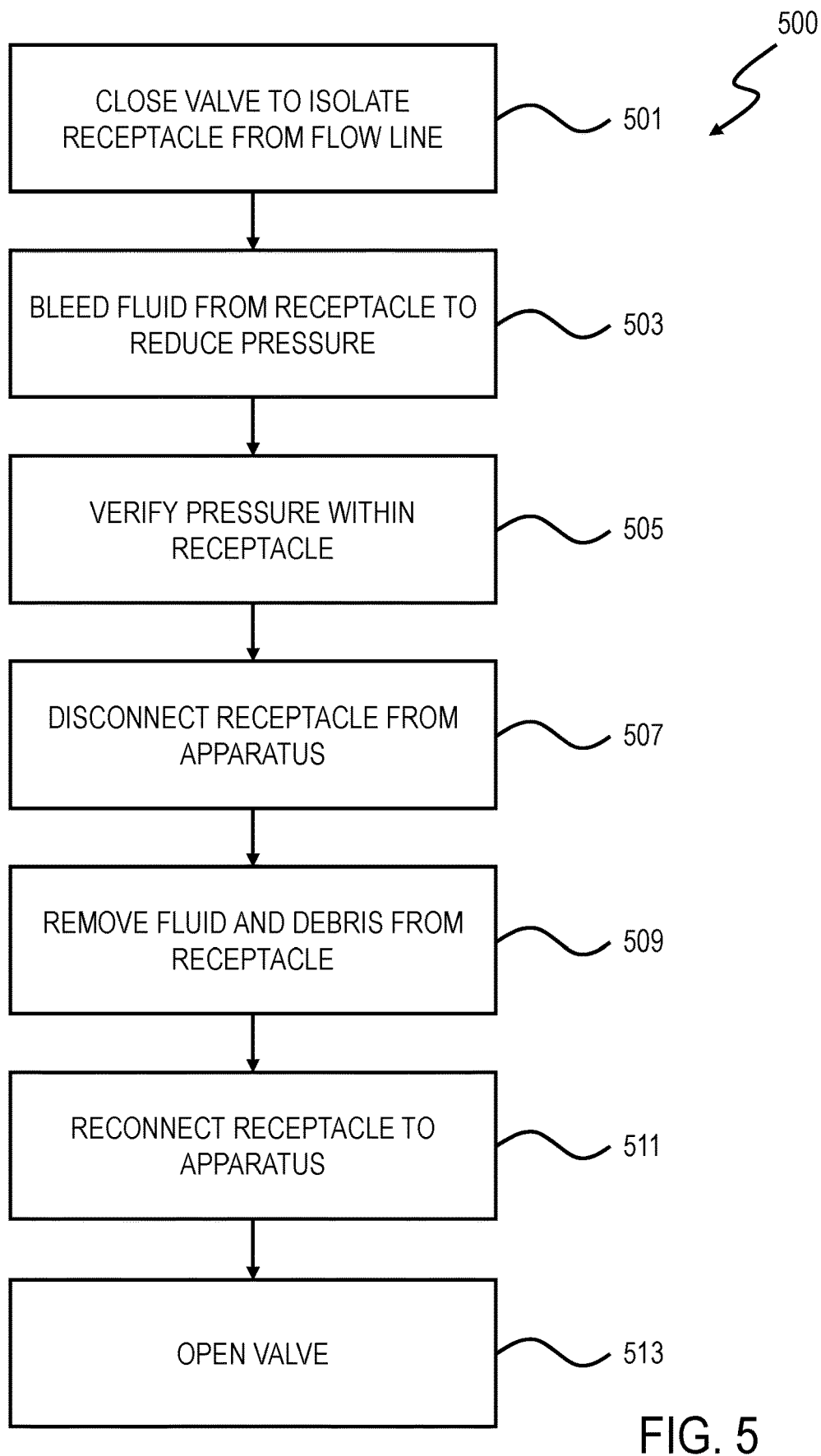
FIG. 5 is a flow chart of an example of a method for servicing a hydrocarbon production apparatus for removing debris.

FIG. 5 is a flow chart of a method 500 for servicing a hydrocarbon production apparatus for removing debris from a fluid flow stream, such as the apparatus 200 shown in FIG. 2. The method 500 starts at 501 by closing a valve to isolate a receptacle of the apparatus from the fluid flow stream. The receptacle can contain fluid and debris from the fluid flow stream.

At 503, a portion of the fluid is bled from the receptacle to reduce pressure within the receptacle. The bleeding can involve opening a bleed valve (such as the valve 217).

At 505, the pressure within the receptacle is verified. The pressure can be verified during or after the bleeding step. Once the pressure is verified as being at an acceptable level (for example, close to atmospheric pressure in consideration of safe operation), method 500 proceeds to 507, where the receptacle is disconnected from the apparatus.

At 509, the debris and a remaining portion of the fluid is removed from the receptacle. The fluid and debris can be disposed or tested in order to gather information about the reservoir. At 511, after the receptacle has been emptied, the receptacle is reconnected to the apparatus, and at 513, the valve is opened, so that the receptacle is back in fluid communication with the fluid flow stream and can receive additional debris.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example implementations do not define or constrain this disclosure. Other changes, substitutions, and alterations are also possible without departing from the spirit and scope of this disclosure.

What is claimed is:

1. A method for removing debris from a hydrocarbon fluid flow stream, comprising:
   receiving a flow of a hydrocarbon fluid that comprises debris into an inlet of a first conduit that comprises a flow path that extends between the inlet and an outlet of the first conduit;
   separating at least a portion of the debris from the hydrocarbon fluid with a first baffle that is coupled to a first portion of an inner surface of the first conduit between the inlet and the outlet, the first baffle comprising a first dimension that is a vertical projection of the first baffle orthogonal to a longitudinal axis of the first conduit;
   separating at least a portion of the debris from the hydrocarbon fluid with a second baffle coupled to a second portion of the inner surface of the first conduit between the inlet and the outlet, the second baffle comprising a second dimension that is a vertical projection of the second baffle orthogonal to the longitudinal axis of the first conduit, a sum of the first and second dimensions equal to or less than a diameter of the first conduit;
   directing, based at least in part on the orientation of the first and second baffles, the separated debris from the flow path of the first conduit into a flow path of a second conduit;
   directing the separated debris from the flow path of the second conduit into a debris receptacle of the second conduit that is angularly connected to the first conduit between the inlet and the outlet;
   fluidly isolating the debris receptacle from the flow path of the first conduit and at least a portion of the flow path of the second conduit; and
   subsequent to fluidly isolating the debris receptacle, removing the portion of separated debris from the debris receptacle.

2. The method of claim 1, wherein isolating the debris receptacle comprises closing a valve fluidly coupled to the second conduit.

3. The method of claim 1, wherein removing the separated debris comprises:
   bleeding a portion of a fluid from the receptacle to reduce pressure within the receptacle;
   verifying the pressure within the receptacle;
   disconnecting the receptacle; and
   removing the separated debris and a remaining portion of the fluid from the receptacle.

4. The method of claim 3, wherein bleeding the portion of the fluid from the receptacle comprises opening a bleed valve.

5. The method of claim 1, further comprising directing the separated debris from the flow path of the first conduit to the flow path of the second conduit at an angle of 90 degrees or less.

6. The method of claim 5, wherein isolating the debris receptacle comprises closing a valve fluidly coupled to the second conduit.

7. The method of claim 5, wherein removing the separated debris comprises:
   bleeding a portion of a fluid from the receptacle to reduce pressure within the receptacle;
   verifying the pressure within the receptacle;
   disconnecting the receptacle; and
   removing the separated debris and a remaining portion of the fluid from the receptacle.

8. The method of claim 7, wherein bleeding the portion of the fluid from the receptacle comprises opening a bleed valve.

9. The method of claim 1, wherein the at least one baffle is coupled to the inner surface of the first conduit at an angle of 90 degrees or less.

10. The method of claim 1, wherein a perpendicular distance between a tip of the at least one baffle and the inner surface of the first conduit is approximately half of a diameter of the first conduit or longer.

11. The method of claim 1, wherein a perpendicular distance between a tip of the second baffle and the inner surface of the first conduit is approximately half of a diameter of the first conduit or longer.

12. The method of claim 1, wherein an axial distance between the tip of the first baffle and a tip of the second baffle is approximately half of a diameter of the first conduit or longer.

13. The method of claim 1, wherein the second baffle is coupled to the inner surface of the first conduit at an angle of 90 degrees or less.

* * * * *